(12) United States Patent
Zeng

(10) Patent No.: US 11,496,024 B2
(45) Date of Patent: Nov. 8, 2022

(54) MOTOR CONTROLLER AND BRUSHLESS DIRECT CURRENT MOTOR COMPRISING THE SAME

(71) Applicant: Zhongshan Broad-Ocean Motor Co., Ltd., Zhongshan (CN)

(72) Inventor: Chongsheng Zeng, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 375 days.

(21) Appl. No.: 16/703,839

(22) Filed: Dec. 4, 2019

(65) Prior Publication Data
US 2020/0395823 A1 Dec. 17, 2020

(30) Foreign Application Priority Data

Jun. 11, 2019 (CN) .......................... 201910502247.6
Jun. 11, 2019 (CN) .......................... 201920871488.3

(51) Int. Cl.
H02K 11/33 (2016.01)
H02K 5/18 (2006.01)
H02K 5/20 (2006.01)

(52) U.S. Cl.
CPC .............. *H02K 11/33* (2016.01); *H02K 5/18* (2013.01); *H02K 5/20* (2013.01); *H02K 2205/09* (2013.01); *H02K 2211/03* (2013.01)

(58) Field of Classification Search
CPC .......... H02K 11/33; H02K 5/207; H02K 5/18; H02K 5/20; H02K 2211/03; H02K 2205/09; H02K 11/00; H02K 11/04; H02K 11/048; H02K 11/049; H02K 11/05; H02K 11/30; H02K 11/38; H02K 9/00; H02K 9/02; H02K 9/22; H02P 6/16
USPC .... 310/68 R, 68 D, 89, 52, 53, 58, 60 A, 64
See application file for complete search history.

(56) References Cited

U.S. PATENT DOCUMENTS

| | | | | |
|---|---|---|---|---|
| 2014/0029202 A1* | 1/2014 | Bian | ...................... | H05K 7/209 361/707 |
| 2014/0175914 A1* | 6/2014 | Zeng | ...................... | H02K 5/20 310/51 |
| 2015/0318752 A1* | 11/2015 | Collins | .................. | H02K 11/33 310/91 |
| 2016/0021765 A1* | 1/2016 | Yu | .......................... | H02K 11/33 361/759 |
| 2016/0149473 A1* | 5/2016 | Wang | ...................... | H02K 5/20 310/64 |
| 2016/0157391 A1* | 6/2016 | Huang | ............... | H05K 7/20927 165/41 |

* cited by examiner

*Primary Examiner* — Alexander A Singh
(74) *Attorney, Agent, or Firm* — Matthias Scholl P.C.; Matthias Scholl

(57) ABSTRACT

A motor controller including a control box and a control panel disposed in the control box. The control box includes at least a first chamber and a second chamber. The control panel is disposed in the first chamber.

15 Claims, 14 Drawing Sheets

MOTOR CONTROLLER AND BRUSHLESS DIRECT CURRENT MOTOR COMPRISING THE SAME

CROSS-REFERENCE TO RELATED APPLICATIONS

Pursuant to 35 U.S.C. § 119 and the Paris Convention Treaty, this application claims foreign priority to Chinese Patent Application No. 201910502247.6 filed Jun. 11, 2019, and to Chinese Patent Application No. 201920871488.3 filed Jun. 11, 2019. The contents of all of the aforementioned applications, including any intervening amendments thereto, are incorporated herein by reference.

BACKGROUND

The disclosure relates to a motor controller and a brushless direct current (BLDC) motor comprising the same.

A conventional BLDC motor, as shown in FIGS. 1-3, includes a motor body and a motor controller. The motor body includes a rotating shaft 1A, a permanent magnet rotor assembly 2A, a stator assembly 3A and a housing assembly. The stator assembly 3A includes a stator core and a coil winding wound on the stator core, and the housing assembly includes a cylinder shell 4A, a front end cover 5A and a rear end cover 6A. The motor controller includes a circuit board 9A disposed in a control box 7A. The control box 7A is directly connected to the rear end cover 6A.

Conventionally, the control box includes only one chamber to receive the circuit board. The heat produced by the circuit board accumulates in the chamber and adversely affects performance of the motor controller.

SUMMARY

Provided is a motor controller having an improved heat dissipation effect.

The disclosure provides a motor controller comprising a control box and a control panel disposed in the control box. The control box comprises at least a first chamber and a second chamber, and the control panel is disposed in the first chamber.

The second chamber is disposed outside the first chamber; the first chamber comprises a first bottom surface, and the second chamber comprises a second bottom surface; and the first bottom surface is higher than the second bottom surface in an axial direction of the control box.

The control panel comprises a bridge rectifier; the bridge rectifier is radially disposed outside the control panel; and the bridge rectifier is fixed on the second bottom surface via a first locking device.

The first bottom surface protrudes to form a first convex plate surrounding the first chamber, and the first convex plate comprises a plurality of ventilation holes.

The motor controller further comprises an insulated gate bipolar transistor (IGBT) driver board; the IGBT driver board comprises a plurality of power modules disposed radially outside the IGBT driver board; the first bottom surface protrudes to form a plurality of convex plates; and the plurality of power modules is attached to the plurality of convex plates and are fixed via a plurality of second locking devices.

The plurality of ventilation holes surrounds the second chamber and the plurality of convex plates.

The control box comprises an outer bottom surface provided with a plurality of radiating ribs, each of the plurality of ventilation holes is disposed between two adjacent radiating ribs.

The plurality of radiating ribs comprises longitudinal radiating ribs and transverse radiating ribs.

The first locking device comprises a first pressure lever and two first bolts disposed at two ends of the pressure lever; the first pressure lever is fixed on the bridge rectifier via the two first bolts.

The plurality of second locking devices each comprises a second pressure lever and two second bolts; each second pressure lever is disposed on two power modules; and the second pressure lever passes through the second pressure lever to fix the two power modules on one convex plate.

The disclosure also provides a BLDC motor comprising a motor body and the motor controller; the motor controller is disposed on one end of the motor body, and the motor body comprises a stator assembly, a rotor assembly, and a housing.

DETAILED DESCRIPTIONS

Figure 1:
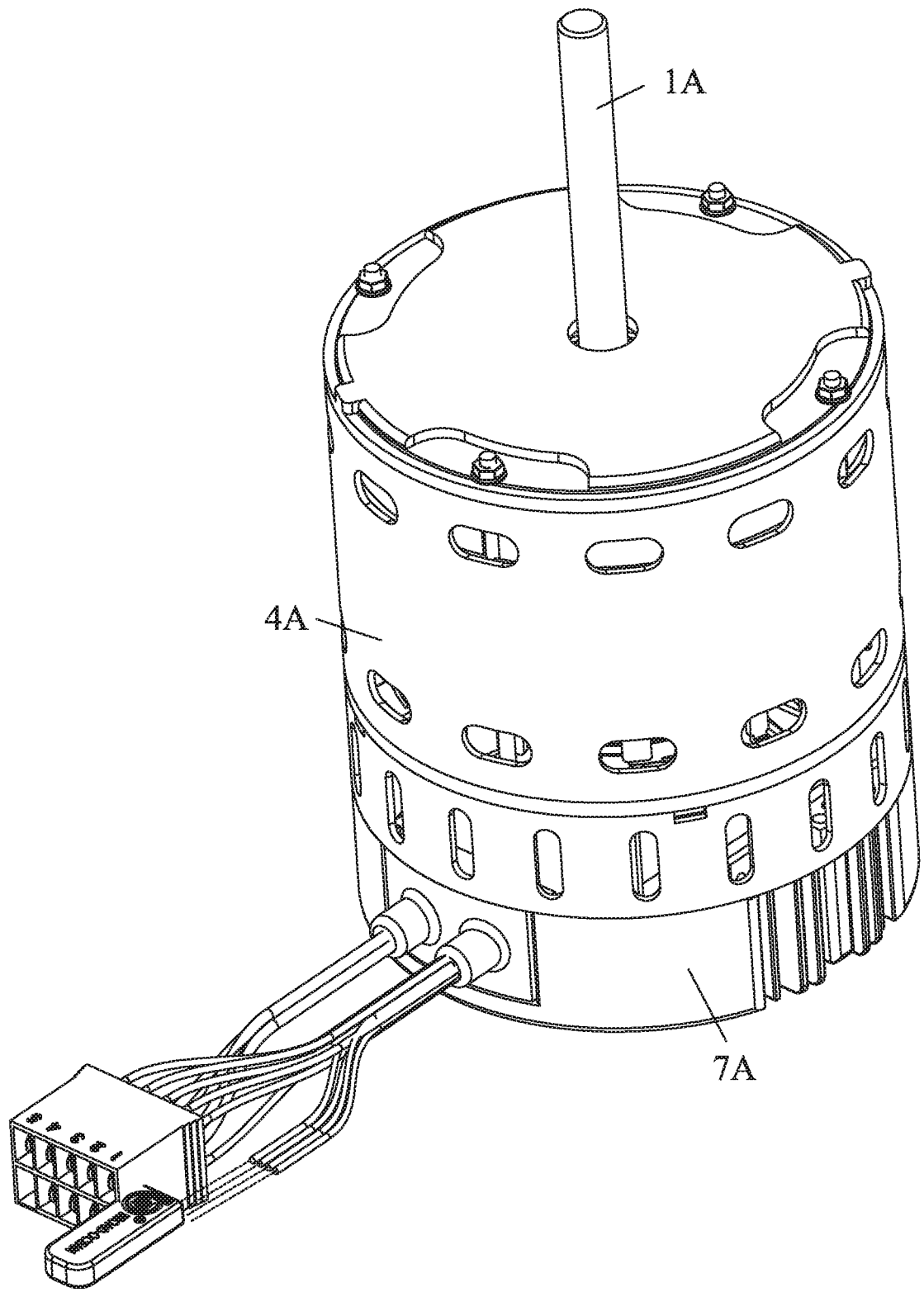
FIG. 1 is a stereogram of a BLDC motor in the related art.
Figure 2:
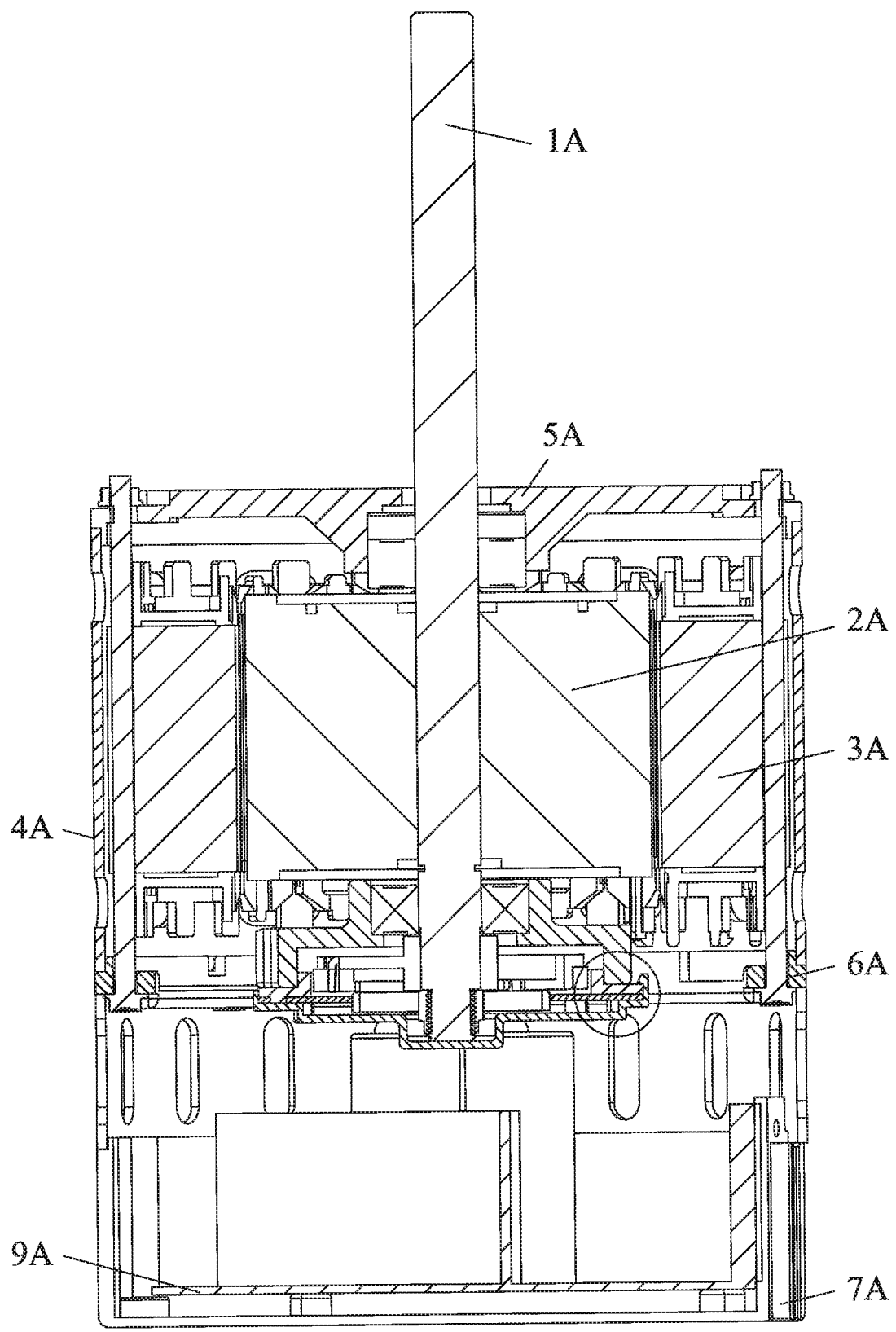
FIG. 2 is a sectional view of a BLDC motor in the related art.
Figure 3:
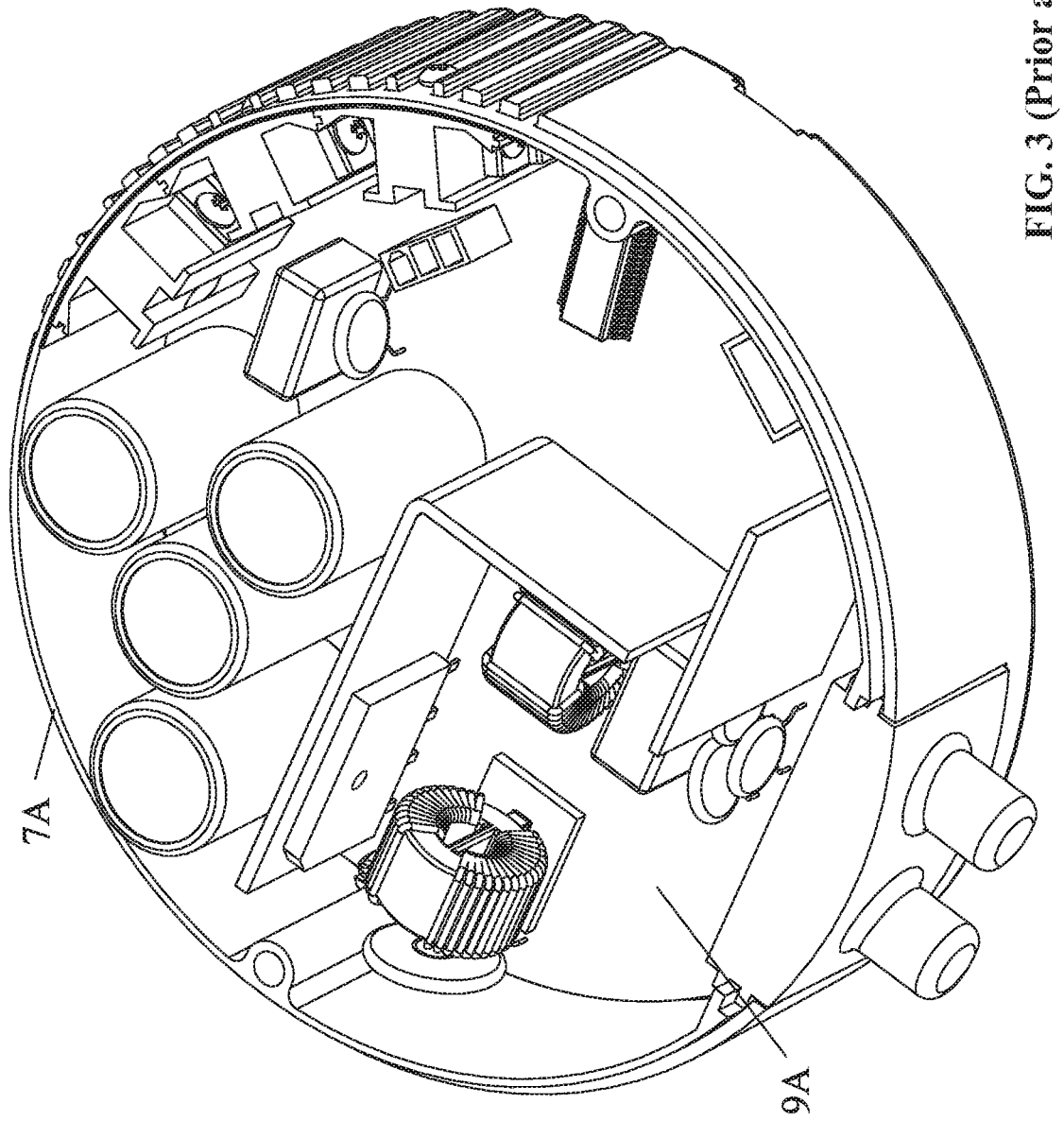
FIG. 3 is a stereogram of a motor controller in the related art.
Figure 4:
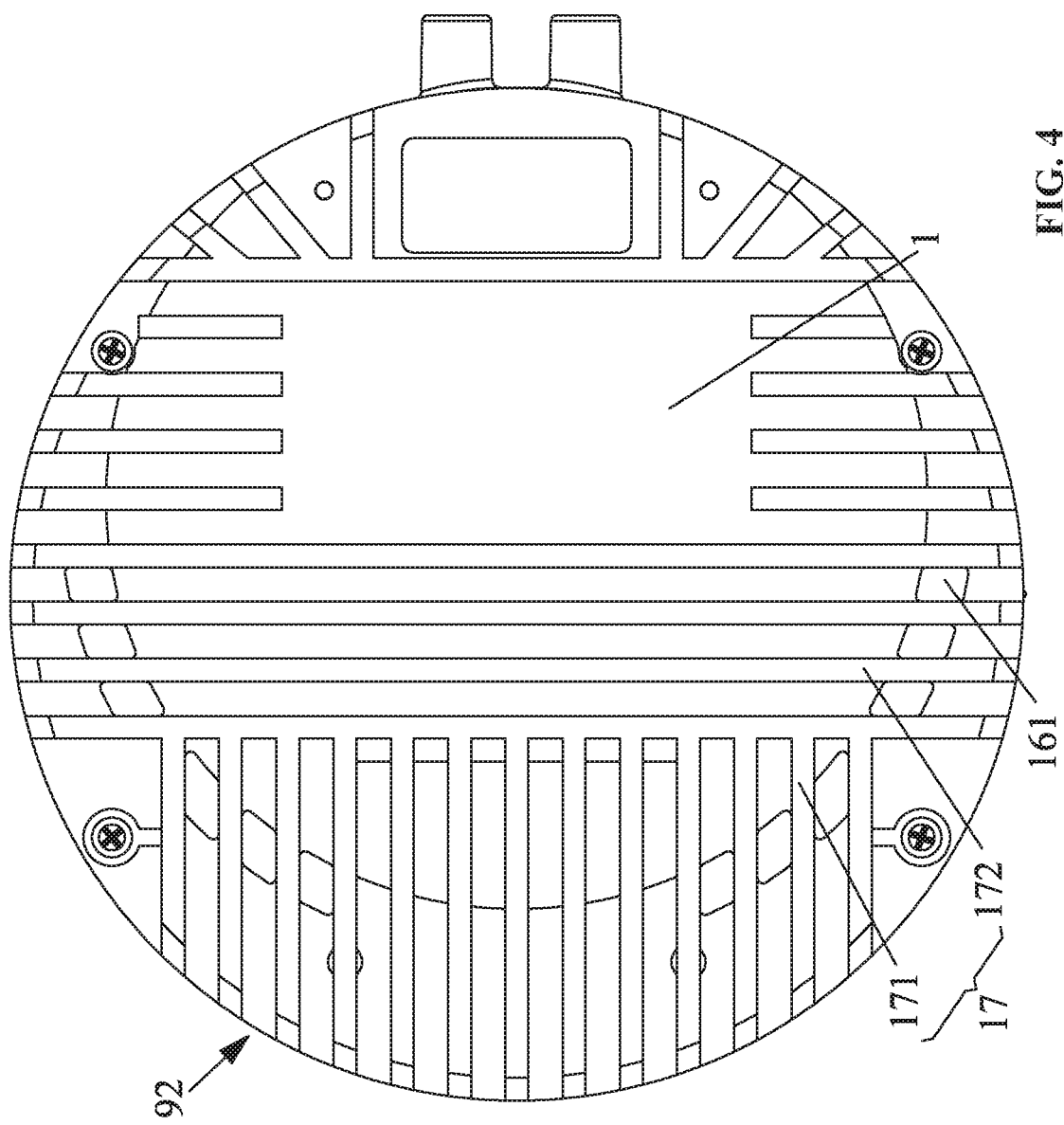
FIG. 4 is a bottom view of a motor controller according to one embodiment of the disclosure.
Figure 5:
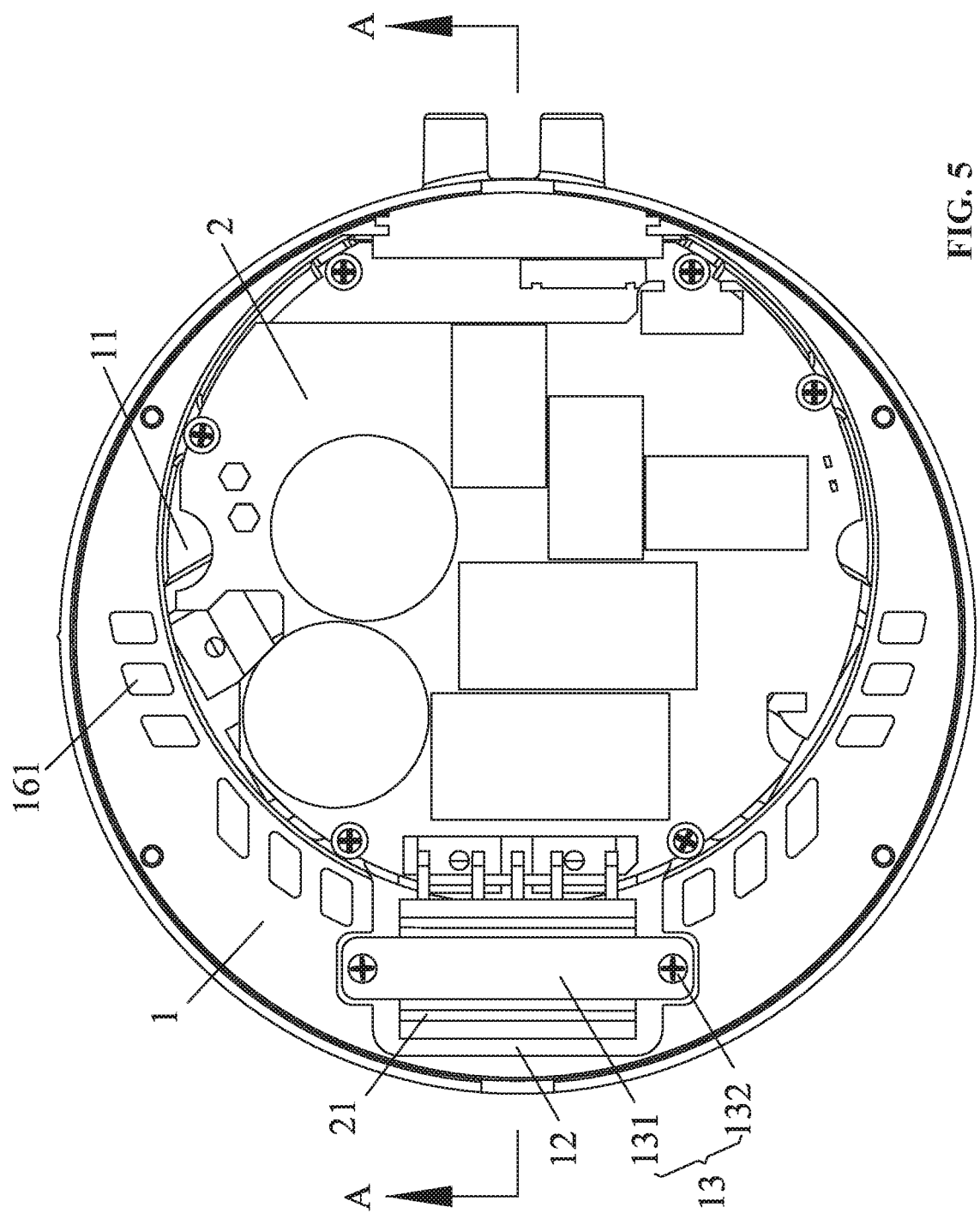
FIG. 5 is a top view of a motor controller according to one embodiment of the disclosure.
Figure 6:
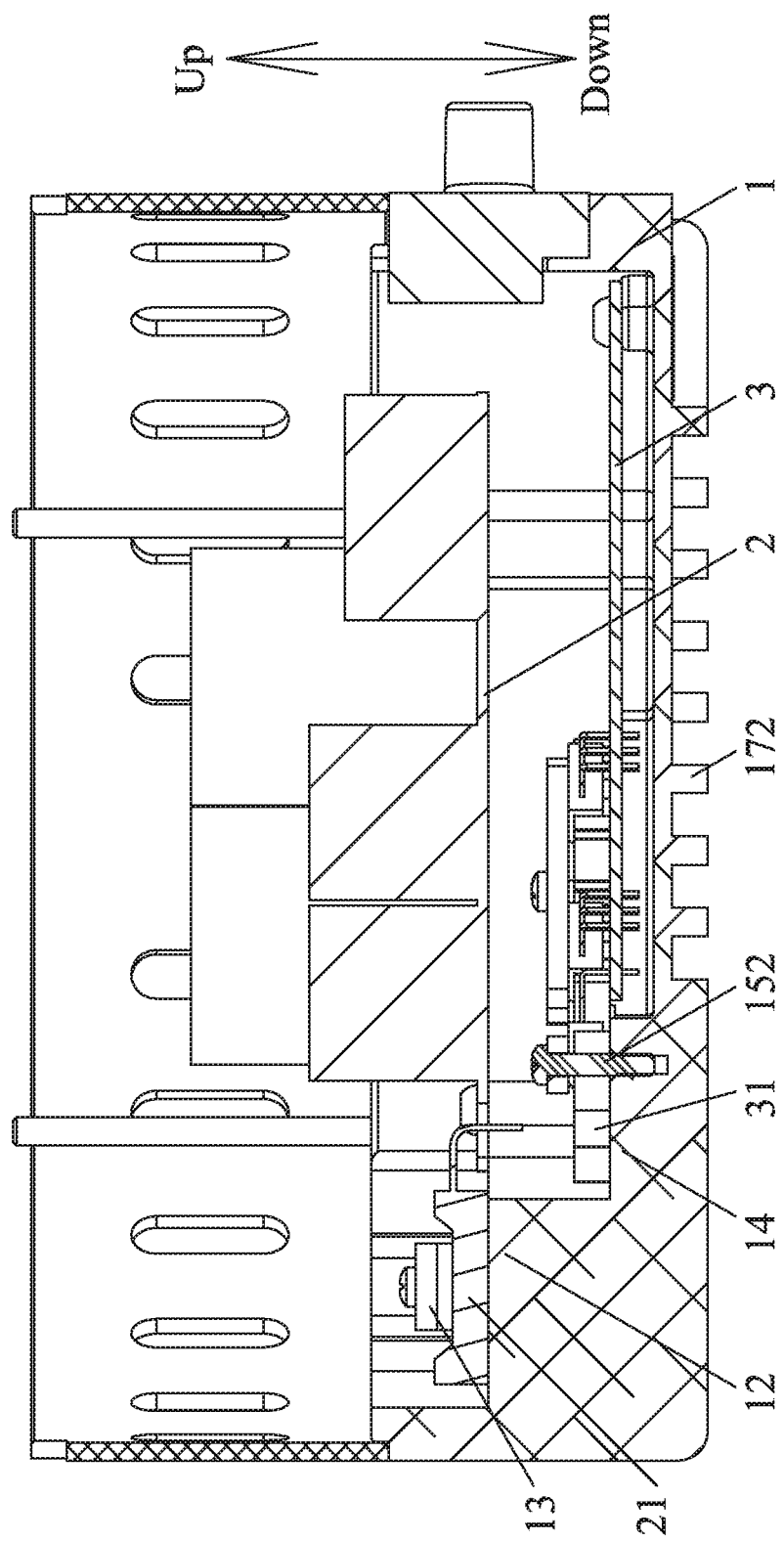
FIG. 6 is a sectional view taken from line A-A in FIG. 5.
Figure 7:
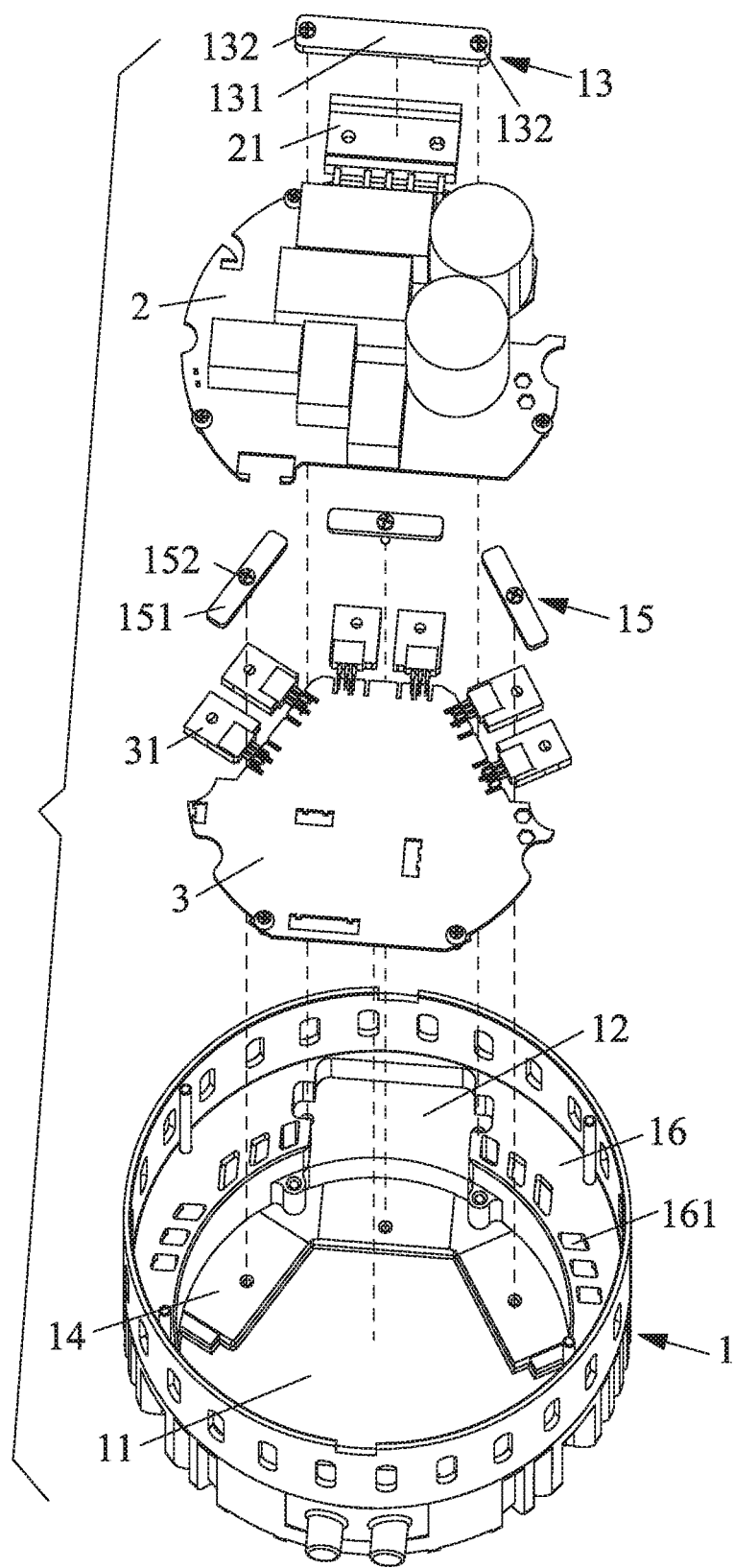
FIG. 7 is an exploded view of a motor controller according to one embodiment of the disclosure.
Figure 8:
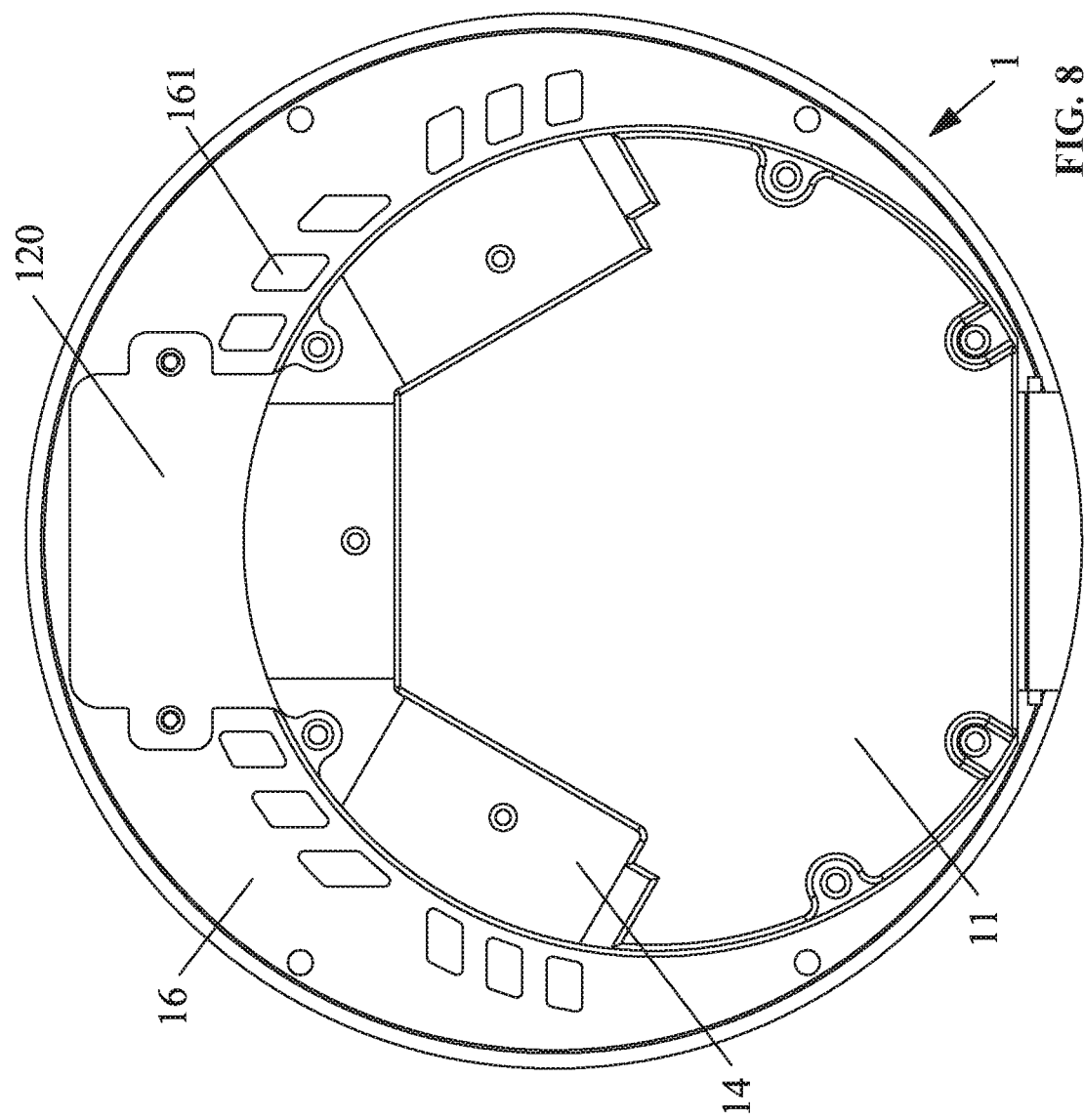
FIG. 8 is a top view of a control box of a motor controller according to one embodiment of the disclosure.
Figure 9:
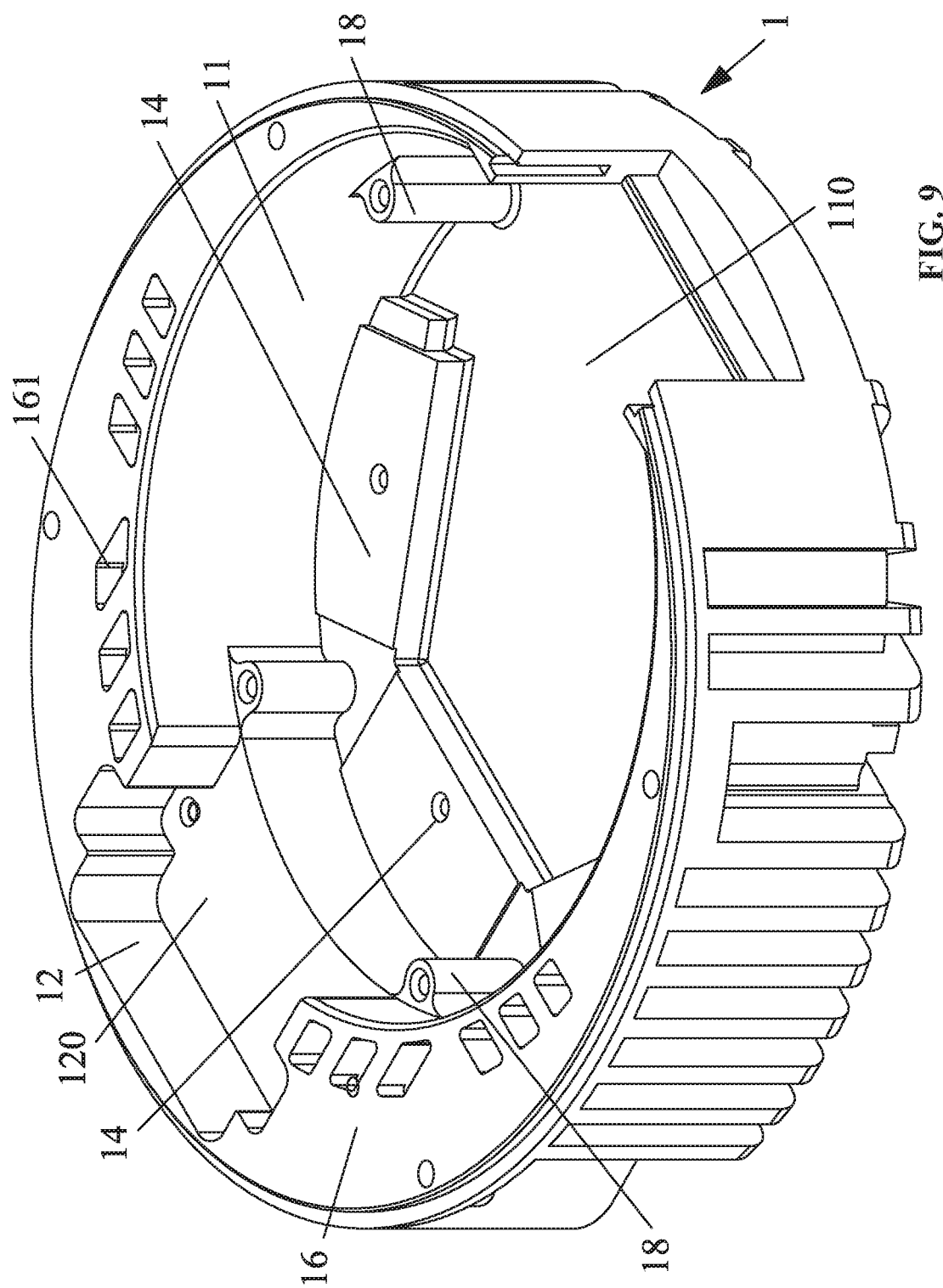
FIG. 9 is a stereogram of a control box of a motor controller according to one embodiment of the disclosure.
Figure 10:
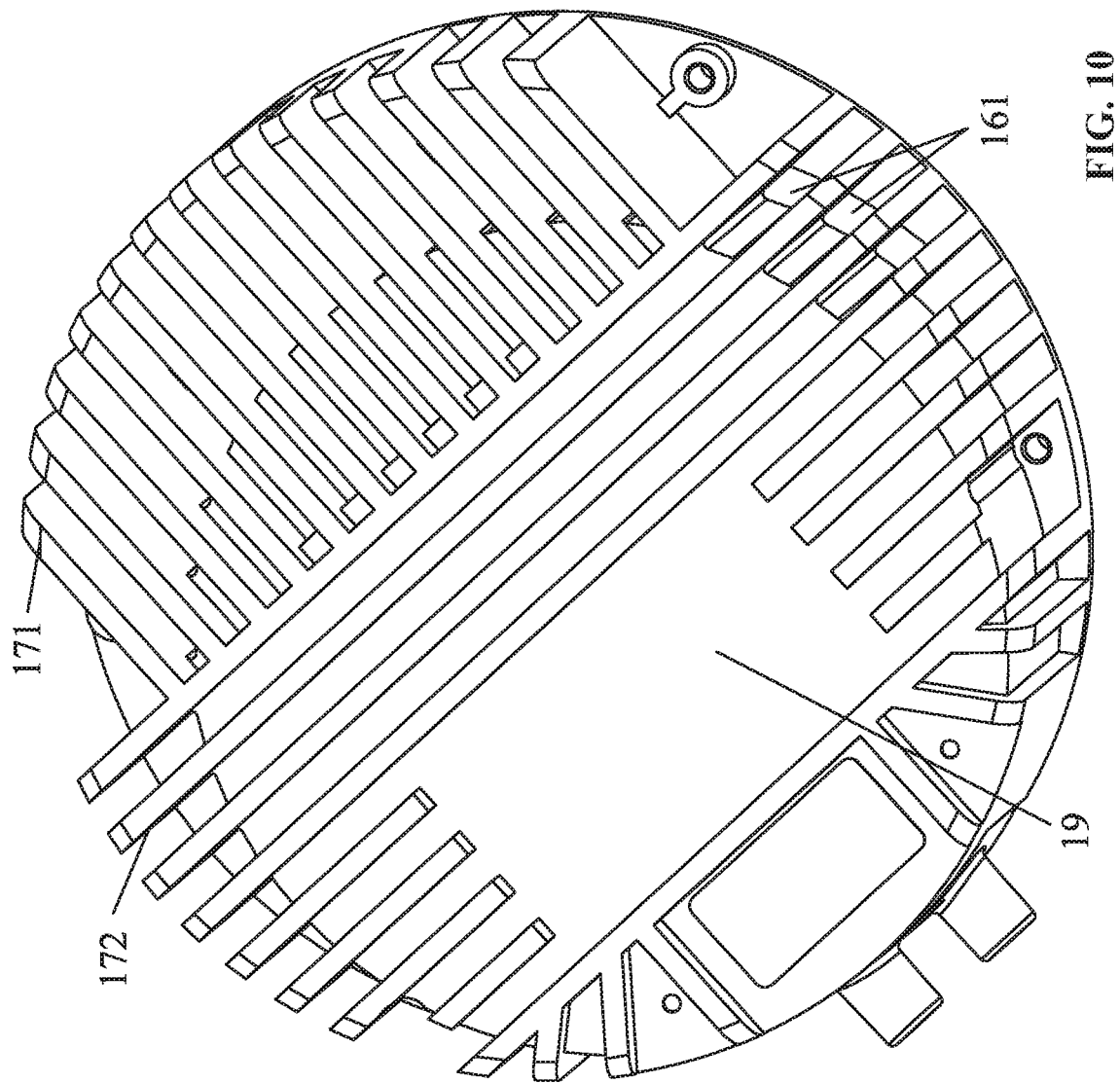
FIG. 10 is another stereogram of a control box of a motor controller according to one embodiment of the disclosure.
Figure 11:
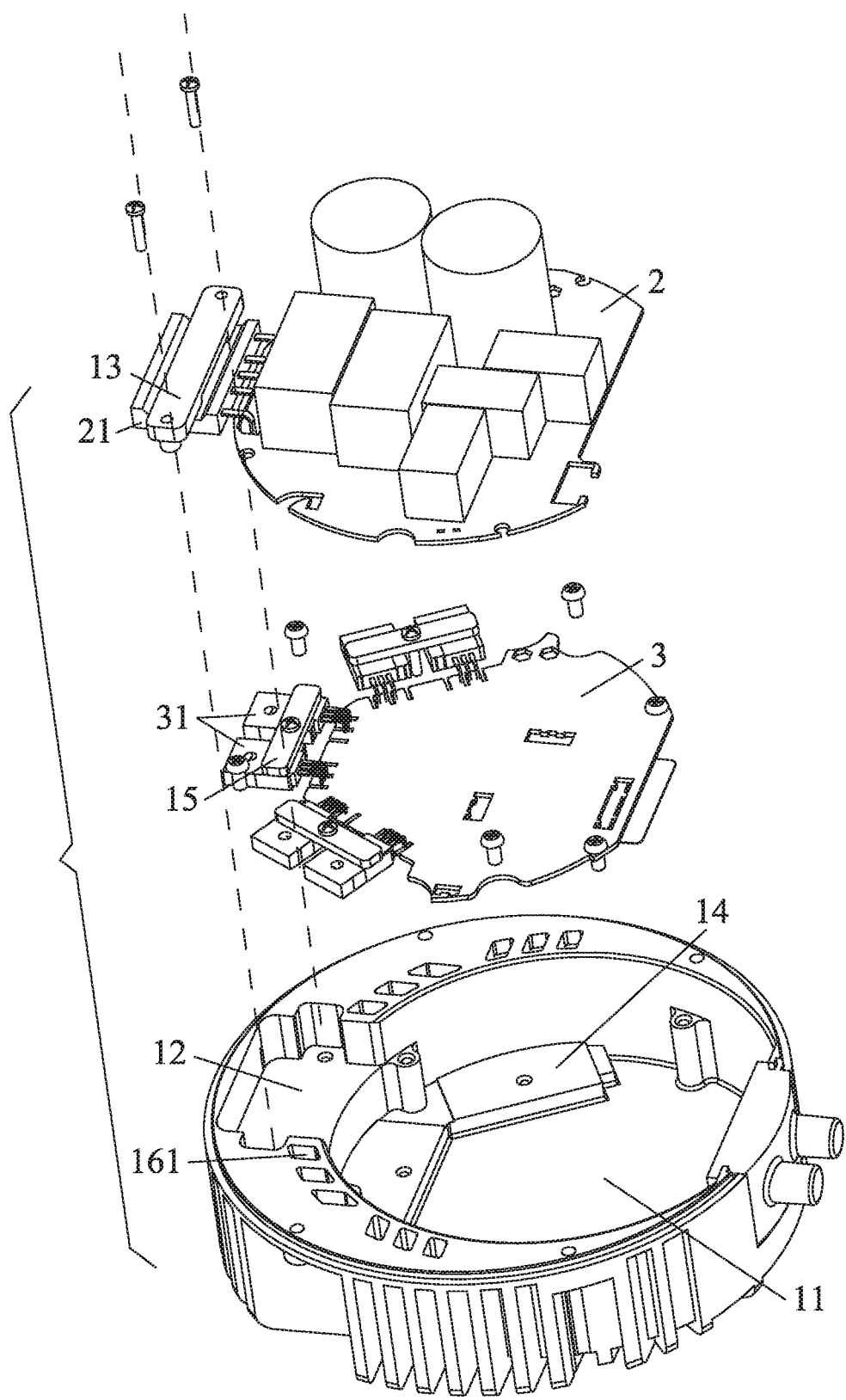
FIG. 11 is another exploded view of a motor controller according to one embodiment of the disclosure.

To further illustrate, embodiments detailing a motor controller are described below. It should be noted that the following embodiments are intended to describe and not to limit the disclosure.

Example 1

As shown in FIGS. 4-12, provided is a motor controller comprising a control box 1 and a control panel 2 disposed in the control box 1. The control box comprises at least a first chamber 11 and a second chamber 12. The control panel 2 is disposed in the first chamber 11. The size of the first chamber 11 is basically the same as that of the control panel 2. The control box 1 has a simple structure, and the motors with different sizes, powers and volumes can be standardized and generalized by being equipped with the control panel 2 and the accommodation chamber with a uniform size, thereby improving the design and production efficiency while reducing cost and simplifying the management.

The second chamber 12 is disposed outside the first chamber 11; the first chamber 11 comprises a first bottom surface 110, and the second chamber 12 comprises a second bottom surface 120; and the first bottom surface 110 is higher than the second bottom surface 120 in an axial direction of the control box 1.

The control panel 2 comprises a bridge rectifier 21; the bridge rectifier 21 is radially disposed outside the control panel; and the bridge rectifier 21 is fixed on the second bottom surface 120 via a first locking device 13. The bridge rectifier 21 is easy to install, and the heat dissipation effect is improved.

The first bottom surface protrudes to form a first convex plate 16 surrounding the first chamber 11, and the first convex plate comprises a plurality of ventilation holes 161. The first convex plate 16 and the plurality of ventilation holes 161 improve the ventilation and heat dissipation of the control box 1.

The motor controller further comprises an insulated gate bipolar transistor (IGBT) driver board 3; the IGBT driver board 3 comprises a plurality of power modules 31 disposed radially outside the IGBT driver board 3; the first bottom surface 110 protrudes to form a plurality of convex plates 14; and the plurality of power modules 31 is attached to the plurality of convex plates 14 and are fixed via a plurality of second locking devices 15. The power modules 31 are easy to install, and the heat dissipation effect is improved.

The plurality of ventilation holes 161 surrounds the second chamber 12 and the plurality of convex plates 14. This improves the heat dissipation effect.

The control box 1 comprises an outer bottom surface provided with a plurality of radiating ribs 17, each of the plurality of ventilation holes 161 is disposed between two adjacent radiating ribs 17.

The plurality of radiating ribs 17 comprises longitudinal radiating ribs 171 and transverse radiating ribs 172. The plurality of radiating ribs 17 cover the entire heat source.

The first locking device 13 comprises a first pressure lever 131 and two first bolts 132 disposed at two ends of the pressure lever 131; the first pressure lever 131 is fixed on the bridge rectifier 21 via the two first bolts 132. The first pressure lever 131 is easy to install. The periphery of the first chamber 11 is a cylinder 19. A plurality of support pillars 18 is disposed on the edge of the first chamber 11. Each support pillar comprises a screw hole. The control panel 2 is fixed on the support pillar 18 by bolts inserting the screw hole.

The plurality of second locking devices 15 each comprises a second pressure lever 151 and two second bolts 152; each second pressure lever 151 is disposed on two power modules; and the second pressure lever 151 passes through the second pressure lever 151 to fix the two power modules on one convex plate 14. The periphery of the first chamber 11 is a cylinder 19. The second pressure lever 151 is easy to install.

Figure 12:
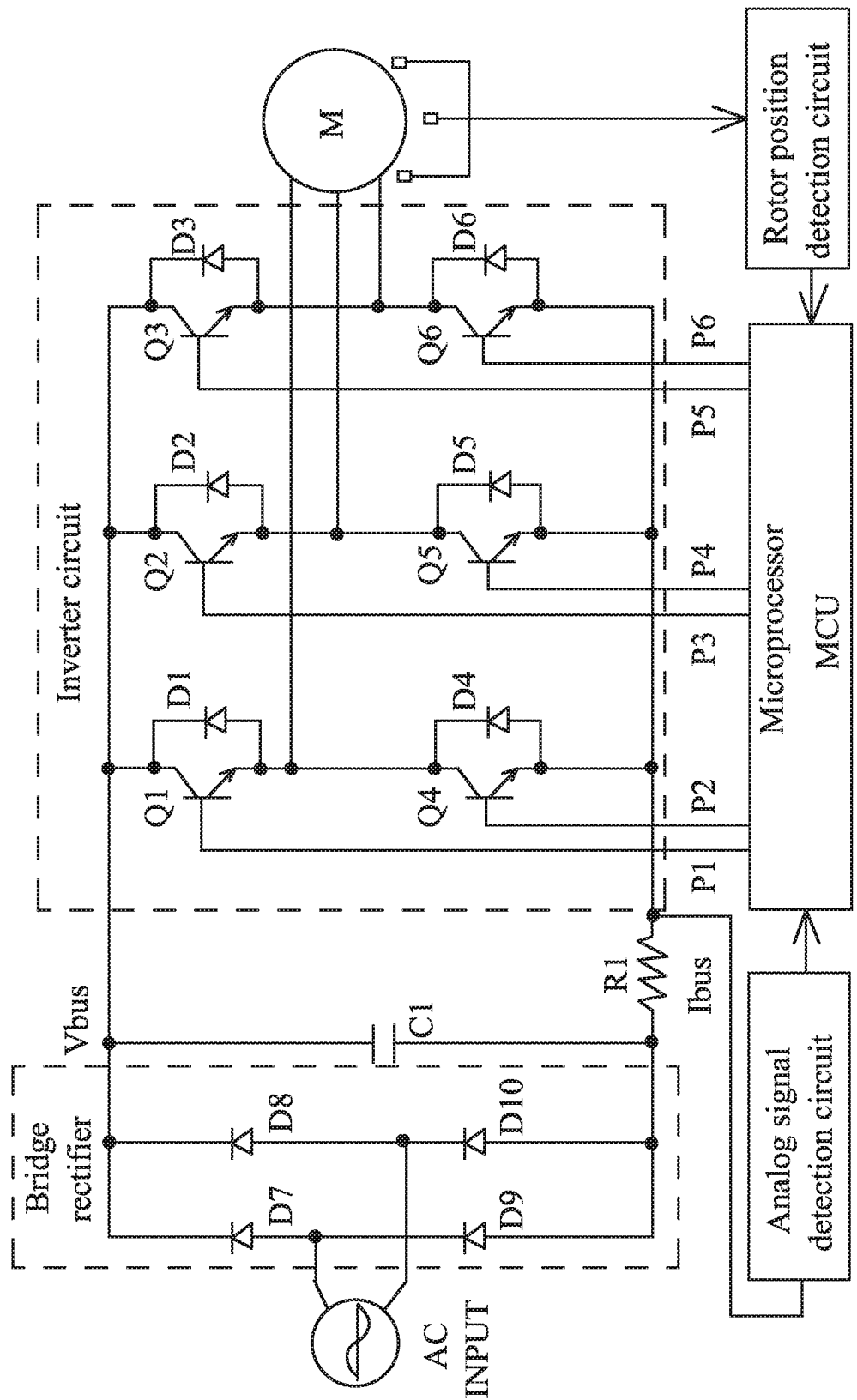
FIG. 12 is a circuit diagram of a motor controller according to one embodiment of the disclosure.

FIG. 12 is a circuit diagram of the motor controller, which comprises a microprocessor, a rotor position detection circuit, an analog signal detection circuit, an inverter circuit, a finishing bridge, and a capacitor C1. The microprocessor, the analog signal detection circuit, the finishing bridge, and the capacitor C1 are integrated on the control panel 2. The power modules 31 of the inverter circuit is integrated on the IGBT driver board 3. The power modules 31 are insulated gate bipolar transistors. The rotor position detection circuit is separately integrated on a Hall circuit board.

Example 2

Figure 13:
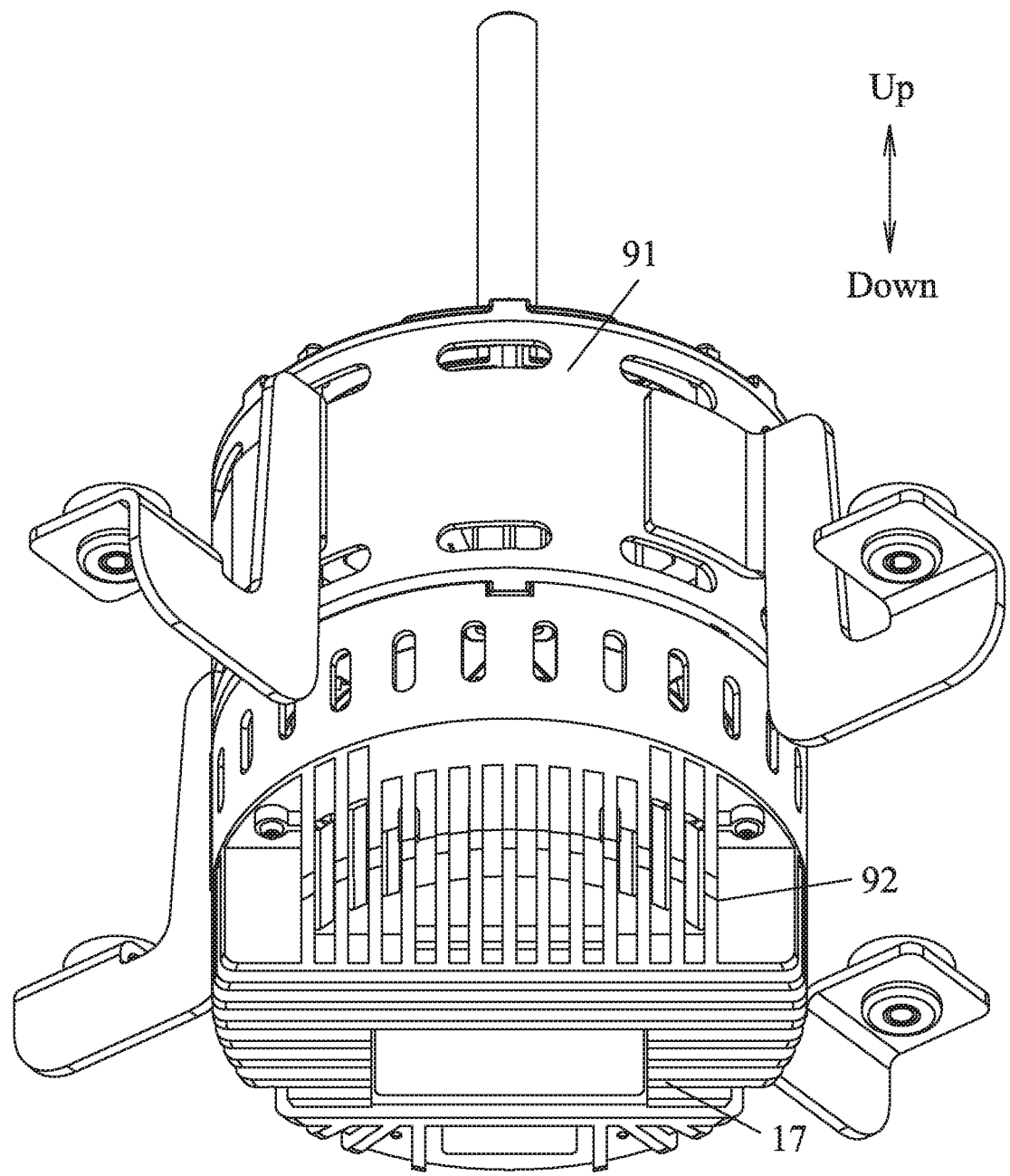
FIG. 13 is a schematic diagram of a BLDC motor according to one embodiment of the disclosure.
Figure 14:
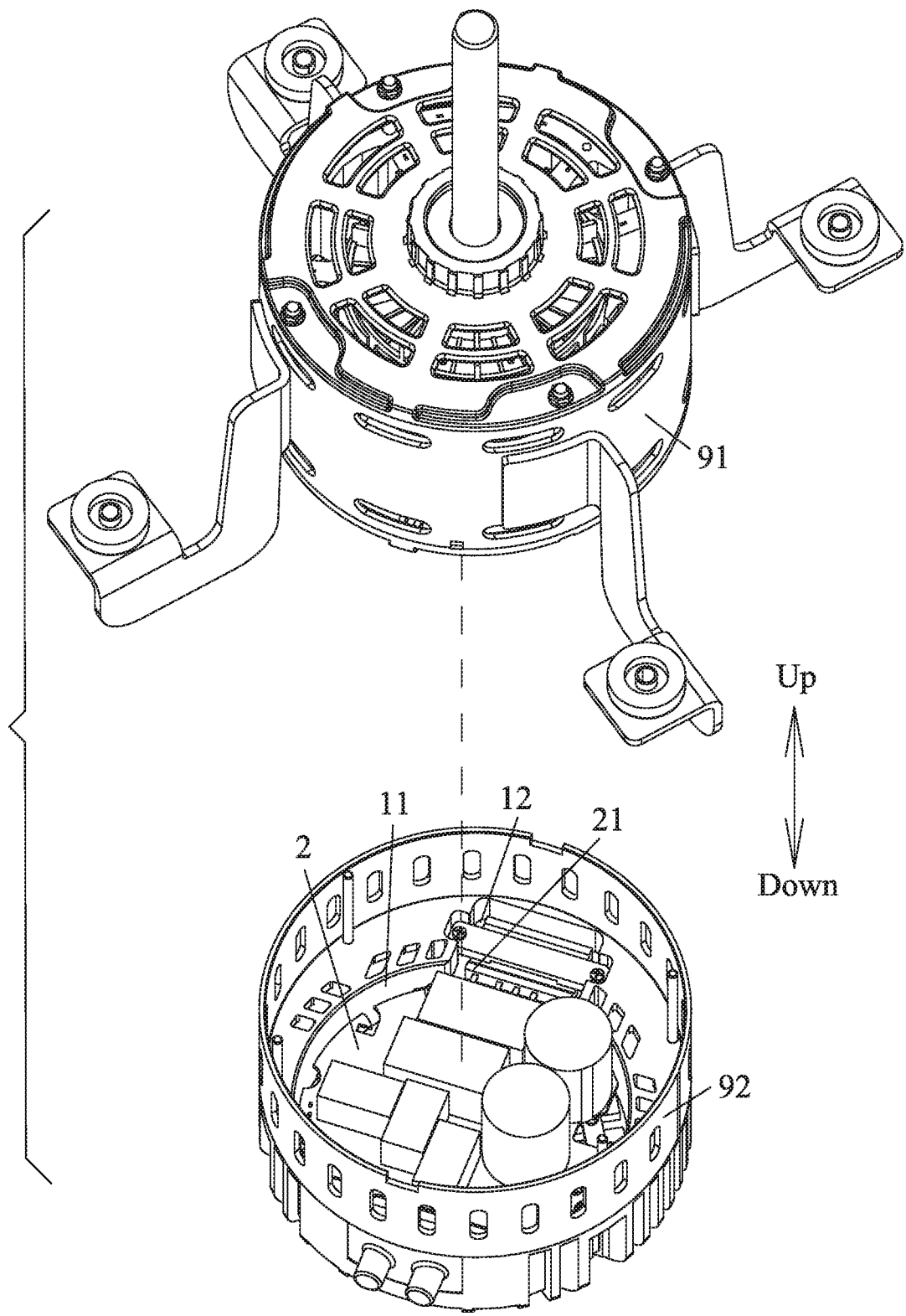
FIG. 14 is an exploded view of a motor controller according to one embodiment of the disclosure.

As shown in FIGS. 13-14, a BLDC motor comprises a motor body 91 and a motor controller 92 of Example 1. The motor controller 92 is disposed on one end of the motor body. The motor body 91 comprising a stator assembly, a rotor assembly, and a housing.

The motor controller 92 is a modified product and exhibits better heat dissipation effect compared with conventional products.

It will be obvious to those skilled in the art that changes and modifications may be made, and therefore, the aim in the appended claims is to cover all such changes and modifications.

What is claimed is:

1. A motor controller, comprising:
   1) a control box; and
   2) a control panel disposed in the control box;
   wherein:
   the control box comprises at least a first chamber and a second chamber, and the control panel is disposed in the first chamber;
   the second chamber is disposed outside the first chamber; the first chamber comprises a first bottom surface, and the second chamber comprises a second bottom surface; and the second bottom surface is higher than the first bottom surface in an axial direction of the control box; and
   the control panel comprises a bridge rectifier; the bridge rectifier is radially disposed outside the control panel; and the bridge rectifier is fixed on the second bottom surface via a first locking device.

2. The controller of claim 1, wherein the first bottom surface protrudes to form a first convex plate surrounding the first chamber, and the first convex plate comprises a plurality of ventilation holes.

3. The controller of claim 2, wherein the motor controller further comprises an insulated gate bipolar transistor (IGBT) driver board; the IGBT driver board comprises a plurality of power modules disposed radially outside the IGBT driver board; the first bottom surface protrudes to form a plurality of convex plates; and the plurality of power modules is attached to the plurality of convex plates and are fixed via a plurality of second locking devices.

4. The controller of claim 3, wherein the plurality of ventilation holes surrounds the second chamber and the plurality of convex plates.

5. The controller of claim 4, wherein the control box comprises an outer bottom surface provided with a plurality of radiating ribs, each of the plurality of ventilation holes is disposed between two adjacent radiating ribs.

6. The controller of claim 3, wherein the plurality of second locking devices each comprises a second pressure lever and a second bolt; each second pressure lever is disposed on two power modules; and the second bolt passes through the second pressure lever to fix the two power modules on one convex plate.

7. The controller of claim 1, wherein the first locking device comprises a first pressure lever and two first bolts disposed at two ends of the pressure lever; the first pressure lever is fixed on the bridge rectifier via the two first bolts.

8. A BLDC motor, comprising a motor body and a motor controller of claim 1, the motor controller being disposed on one end of the motor body, and the motor body comprising a stator assembly, a rotor assembly, and a housing.

9. A motor controller, comprising:
1) a control box comprising a cylindrical housing, a first chamber having a first bottom surface, and a second chamber; and
2) a control panel disposed in the control box;

wherein:
the control panel is disposed in the first chamber;
a first convex plate protrudes from the first bottom surface;
the first chamber and the second chamber are surrounded by the first convex plate;
the first chamber, the second chamber, and the first convex plate are disposed within the cylindrical housing; and
the first convex plate comprises a plurality of ventilation holes.

10. The controller of claim 9, wherein the second chamber is disposed outside the first chamber; the second chamber comprises a second bottom surface; and the second bottom surface is higher than the first bottom surface in an axial direction of the control box.

11. The controller of claim 9, wherein the motor controller further comprises an insulated gate bipolar transistor (IGBT) driver board; the IGBT driver board comprises a plurality of power modules disposed radially outside the IGBT driver board; the first bottom surface protrudes to form a plurality of convex plates; and the plurality of power modules is attached to the plurality of convex plates and are fixed via a plurality of second locking devices.

12. The controller of claim 11, wherein the plurality of ventilation holes surrounds the second chamber and the plurality of convex plates.

13. The controller of claim 12, wherein the control box comprises an outer bottom surface provided with a plurality of radiating ribs, each of the plurality of ventilation holes is disposed between two adjacent radiating ribs.

14. The controller of claim 13, wherein the plurality of radiating ribs comprises longitudinal radiating ribs and transverse radiating ribs.

15. The controller of claim 11, wherein the plurality of second locking devices each comprises a second pressure lever and a second bolt; each second pressure lever is disposed on two power modules; and the second bolt passes through the second pressure lever to fix the two power modules on one convex plate.

* * * * *